(12) United States Patent
Jones et al.

(10) Patent No.: US 10,107,139 B1
(45) Date of Patent: Oct. 23, 2018

(54) ACOUSTIC LINERS FOR TURBINE ENGINES

(71) Applicants: Michael G. Jones, Newport News, VA (US); Joseph E. Grady, Avon, OH (US); James D. Kiser, Hinckley, OH (US); Christopher Miller, Rocky River, OH (US); James D. Heidmann, Solon, OH (US)

(72) Inventors: Michael G. Jones, Newport News, VA (US); Joseph E. Grady, Avon, OH (US); James D. Kiser, Hinckley, OH (US); Christopher Miller, Rocky River, OH (US); James D. Heidmann, Solon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/332,524

(22) Filed: Oct. 24, 2016

Related U.S. Application Data

(63) Continuation of application No. 13/537,816, filed on Jun. 29, 2012, now Pat. No. 9,514,734.

(60) Provisional application No. 61/503,033, filed on Jun. 30, 2011.

(51) Int. Cl.
*G10K 11/172* (2006.01)
*F02C 7/045* (2006.01)
*G10K 11/16* (2006.01)
*F01D 25/04* (2006.01)

(52) U.S. Cl.
CPC ............ *F01D 25/04* (2013.01); *G10K 11/161* (2013.01); *G10K 11/172* (2013.01); *F05D 2220/30* (2013.01); *F05D 2260/96* (2013.01)

(58) Field of Classification Search
CPC ...... F02K 1/827; F02C 7/045; F05D 2220/30; F05D 2260/96; B32B 3/12; F01D 25/04; G10K 11/161; G10K 11/172
See application file for complete search history.

(56) References Cited

U.S. PATENT DOCUMENTS

| | | | | |
|---|---|---|---|---|
| 2,020,639 A | * | 11/1935 | Ballenger | E04C 2/18 220/DIG. 9 |
| 3,769,767 A | * | 11/1973 | Scott | E04C 2/365 181/288 |
| 3,850,261 A | * | 11/1974 | Hehmann | F02C 7/24 181/286 |
| 4,001,473 A | * | 1/1977 | Cook | B32B 3/12 181/292 |
| 4,084,367 A | * | 4/1978 | Saylor | B29D 24/005 181/292 |

(Continued)

*Primary Examiner* — Edgardo San Martin
(74) *Attorney, Agent, or Firm* — Robert H. Earp, III; William M. Johnson

(57) ABSTRACT

An improved acoustic liner for turbine engines is disclosed. The acoustic liner may include a straight cell section including a plurality of cells with straight chambers. The acoustic liner may also include a bent cell section including one or more cells that are bent to extend chamber length without increasing the overall height of the acoustic liner by the entire chamber length. In some cases, holes are placed between cell chambers in addition to bending the cells, or instead of bending the cells.

6 Claims, 14 Drawing Sheets

(56) References Cited

U.S. PATENT DOCUMENTS

| | | | | |
|---|---|---|---|---|
| 4,091,892 A * | 5/1978 | Hehmann | ............... | F02K 1/827 181/212 |
| 4,150,732 A * | 4/1979 | Hoch | ................ | F02C 7/24 181/213 |
| 4,257,998 A * | 3/1981 | Diepenbrock, Jr. | .... | B29C 33/52 181/222 |
| 4,298,090 A * | 11/1981 | Chapman | ............... | F02C 7/24 181/286 |
| 4,433,751 A * | 2/1984 | Bonneau | ............... | F02K 1/827 181/213 |
| 4,531,362 A * | 7/1985 | Barry | ............... | F01D 25/06 415/119 |
| 4,594,120 A * | 6/1986 | Bourland, Jr. | .......... | E04C 2/365 156/155 |
| 4,645,032 A * | 2/1987 | Ross | ............... | F02C 7/24 181/224 |
| 4,697,769 A | 10/1987 | Blackwelder et al. | | |
| 4,849,276 A * | 7/1989 | Bendig | ............... | B32B 3/12 181/292 |
| 5,160,248 A * | 11/1992 | Clarke | ............... | F01D 21/045 156/276 |
| 5,543,198 A * | 8/1996 | Wilson | ............... | B32B 3/12 181/292 |
| 5,758,823 A | 6/1998 | Glezer et al. | | |
| 5,895,897 A * | 4/1999 | Sasaki | ............... | G10K 11/162 181/286 |
| 5,919,029 A * | 7/1999 | Van Nostrand | .... | G10K 11/1788 181/206 |
| 5,923,003 A * | 7/1999 | Arcas | ............... | B64C 21/04 181/213 |
| 5,997,985 A * | 12/1999 | Clarke | ............... | B32B 3/12 181/286 |
| 6,045,310 A | 4/2000 | Miller et al. | | |
| 6,114,652 A * | 9/2000 | Clarke | ............... | B32B 3/12 219/121.71 |
| 6,122,892 A * | 9/2000 | Gonidec | ............... | B32B 3/12 428/116 |
| 6,182,787 B1 * | 2/2001 | Kraft | ............... | F02C 7/045 181/292 |
| 6,203,656 B1 * | 3/2001 | Syed | ............... | B29C 65/5057 156/292 |
| 6,379,110 B1 | 4/2002 | McCormick et al. | | |
| 6,682,021 B1 | 1/2004 | Truax et al. | | |
| 6,759,159 B1 | 7/2004 | Gray et al. | | |
| 6,869,049 B2 | 3/2005 | Saddoughi | | |
| 6,911,158 B2 | 6/2005 | Oishi et al. | | |
| 7,198,234 B2 | 4/2007 | Saddoughi | | |
| 7,458,221 B1 | 12/2008 | Arnold et al. | | |
| 7,475,549 B2 | 1/2009 | Alexander et al. | | |
| 7,510,149 B2 | 3/2009 | Miller et al. | | |
| 7,677,026 B2 | 3/2010 | Conete et al. | | |
| 7,688,583 B1 | 3/2010 | Arik et al. | | |
| 7,784,283 B2 * | 8/2010 | Yu | ............... | F02K 1/04 181/213 |
| 7,823,839 B2 | 11/2010 | Glezer et al. | | |
| 8,043,690 B2 | 10/2011 | Hand et al. | | |
| 8,047,004 B2 | 11/2011 | Brown et al. | | |
| 8,464,831 B2 * | 6/2013 | Olander Burak | ..... | F01D 25/162 181/290 |
| 8,651,233 B2 * | 2/2014 | Ayle | ............... | G10K 11/172 181/292 |
| 8,857,566 B2 * | 10/2014 | Ayle | ............... | G10K 11/172 181/292 |
| 8,931,588 B2 * | 1/2015 | Murray | ............... | F02K 3/06 181/214 |
| 9,334,059 B1 * | 5/2016 | Jones | ............... | B64D 33/02 |
| 9,476,359 B2 * | 10/2016 | Soria | ............... | F02K 1/827 |
| 9,514,734 B1 * | 12/2016 | Jones | ............... | G10K 11/172 |
| 9,546,602 B2 * | 1/2017 | Julliard | ............... | B64D 33/06 |
| 9,650,963 B2 * | 5/2017 | Nampy | ............... | F02C 7/24 |
| 9,708,930 B2 * | 7/2017 | Koroly | ............... | F01D 25/04 |
| 9,732,677 B1 * | 8/2017 | Chien | ............... | F02C 7/24 |
| 2003/0098200 A1 * | 5/2003 | Clark | ............... | F24F 13/02 181/292 |
| 2004/0163888 A1 * | 8/2004 | Johnson | ............... | B64D 29/00 181/292 |
| 2006/0169532 A1 * | 8/2006 | Patrick | ............... | F02C 7/045 181/210 |
| 2006/0169533 A1 * | 8/2006 | Patrick | ............... | B64D 33/02 181/210 |
| 2007/0256889 A1 * | 11/2007 | Yu | ............... | F02K 1/04 181/214 |
| 2009/0260364 A1 | 10/2009 | Keller et al. | | |
| 2010/0284789 A1 * | 11/2010 | Brooks | ............... | F01D 5/26 415/119 |
| 2010/0284790 A1 * | 11/2010 | Pool | ............... | F01D 5/16 415/119 |
| 2011/0108357 A1 | 5/2011 | Vauchel et al. | | |
| 2011/0138765 A1 | 6/2011 | Lugg | | |
| 2011/0167785 A1 | 7/2011 | Moore et al. | | |
| 2011/0167786 A1 | 7/2011 | Marques et al. | | |
| 2011/0219775 A1 | 9/2011 | Jarmon et al. | | |
| 2012/0066882 A1 | 3/2012 | Hand et al. | | |
| 2012/0156006 A1 * | 6/2012 | Murray | ............... | F02C 7/045 415/119 |
| 2012/0168248 A1 * | 7/2012 | Burak | ............... | F01D 25/162 181/292 |
| 2013/0299274 A1 * | 11/2013 | Ayle | ............... | G10K 11/172 181/292 |
| 2014/0090923 A1 * | 4/2014 | Murray | ............... | F02K 3/06 181/222 |
| 2015/0037135 A1 * | 2/2015 | Kempton | ............... | B64D 33/02 415/1 |
| 2015/0086335 A1 * | 3/2015 | Merlo | ............... | F02K 1/827 415/119 |

* cited by examiner

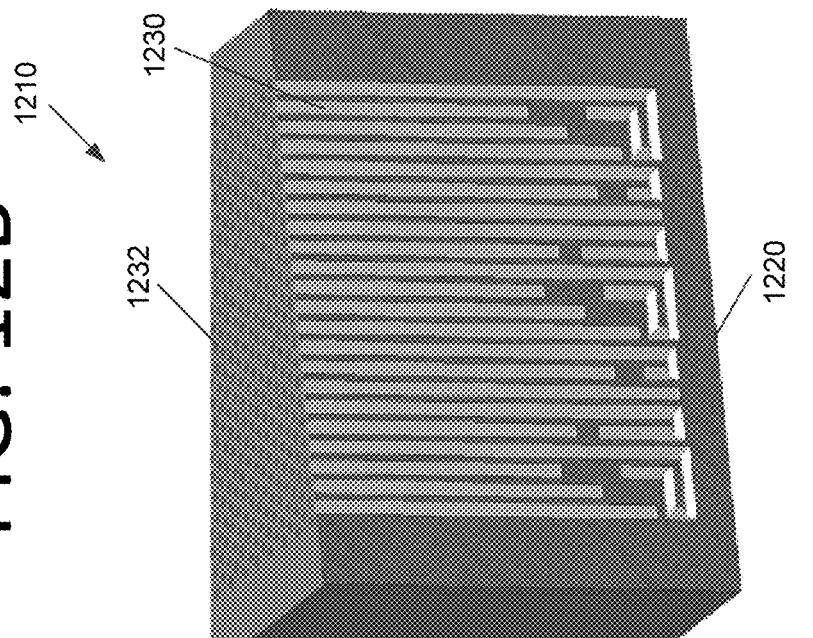
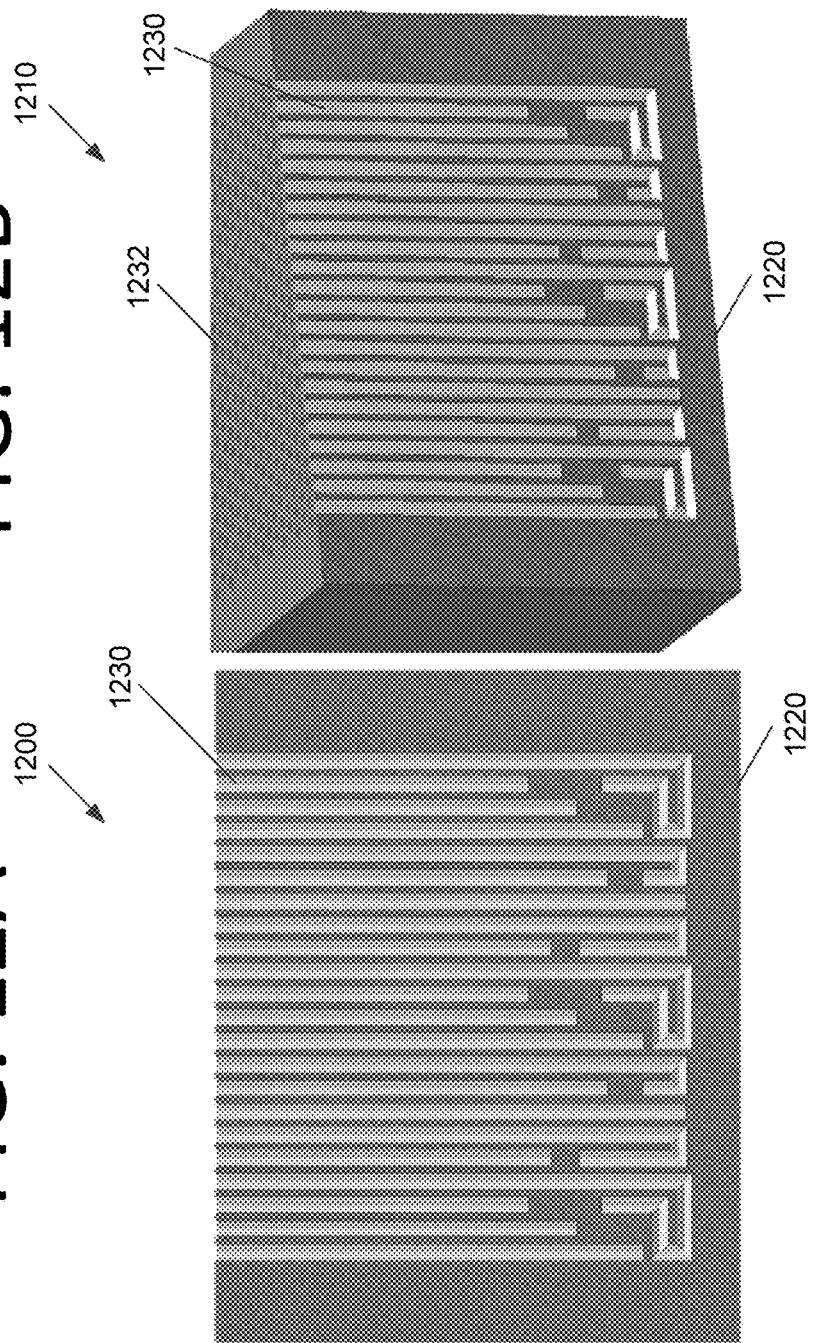

ACOUSTIC LINERS FOR TURBINE ENGINES

CROSS REFERENCE TO RELATED APPLICATIONS

This application is a Continuation Application claiming the benefit of priority from U.S. patent application Ser. No. 13/537,816, filed on Jun. 29, 2012, pending, which claims priority to U.S. Provisional Patent Application Ser. No. 61/503,033, entitled "Compact, Lightweight, CMC (Ceramic Matrix Composite)-Based Acoustic Liner for Subsonic Jet Aircraft Engines—Offering High Temperature Capability, Weight Reduction, and Broadband Acoustic Treatment", filed Jun. 30, 2011, the subject matter of which is hereby incorporated by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention generally pertains to noise reduction, and more specifically, to improved acoustic liners for turbine engines.

BACKGROUND

Turbine engines generally produce a high level of noise across a broad spectrum, and the turbofan engine is the dominant contributor to overall aircraft noise. As such, reduction of turbofan noise is important for aircraft compliance with current and future noise regulations. Fan noise has traditionally been reduced by a combination of passive liner treatments and nacelle modifications. Conventional, passive liners generally consist of a honeycomb core bonded between a porous facesheet and an impervious backplate. Such a configuration produces an array of independent, one-dimensional, tuned waveguides that behave as local-reacting absorbers. The acoustic absorption spectra of such structures are characterized by a single peak at the system resonance frequency and its odd harmonics with significantly reduced absorption at other frequencies.

In an attempt to increase bandwidth, a Helmholtz resonator could be used to reduce noise in lower frequencies, in which the volume of the chamber is sufficiently large to allow absorption of the low frequency. However, this typically means that all of the available volume is used to reduce low frequency noise, and there is insufficient additional volume for liner components targeting the higher frequencies. Another approach to broadband noise reduction is to provide an acoustic liner having cells of variable height, where the cells are arranged from shortest height to tallest height, gradually increasing with each successive cell. Acoustic liner 100 of FIG. 1 shows such a design, where cells 110 vary in height from 1.5 inches to 12 inches. However, such configurations have unacceptable thickness for many turbine engine designs. For instance, if the cells of the acoustic liner are all oriented at a steep angle with respect to the nacelle/exhaust nozzle, as is the case in FIG. 1, then the liner may become unacceptably thick. In particular, this is a significant concern in the core region of the engine, where the volume available for an acoustic liner is limited and the trend tends to be for reduction of core cross-sectional area. Accordingly, an acoustic liner that can absorb a wide range of frequencies without having undue thickness may be beneficial.

SUMMARY

Certain embodiments of the present invention may be implemented and provide solutions to the problems and needs in the art that have not yet been fully solved by conventional acoustic liners. For example, certain embodiments of the present invention increase the effective cell height for lower frequency absorption by bending the cells, putting holes between two or more cells, or both.

In one embodiment of the present invention, an apparatus includes a straight cell section including a plurality of cells with straight chambers. The apparatus also includes a bent cell section including one or more cells that are bent to extend chamber length without increasing the overall height of the apparatus by the entire chamber length.

In another embodiment of the present invention, an apparatus includes one or more cell tuples including a plurality of cells. Each of the plurality of cells includes a respective chamber. The respective chambers of two or more of the plurality of cells are communicably connected via one or more holes.

In another embodiment of the present invention, an acoustic liner includes a cell tuple including a plurality of cells. An outer wall of one or more of the plurality of cells includes a perforated septum configured to permit passage of air from an airflow. At least two of the plurality of cells are connected via one or more holes in cell chambers, forming a length that is different than a height of at least one of the individual cells.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 12A illustrates a front cutaway view of a variable depth straight and bent cell acoustic liner, according to an embodiment of the present invention.

FIG. 12B illustrates an orthogonal cutaway view of a variable depth straight and bent cell acoustic liner, according to an embodiment of the present invention.

FIGS. 10A through 14 were adapted from FIGS. 11-16 and 1, respectively, from *Development and Validation of an Interactive Liner Design and Impedance Modeling Tool* by Brian M. Howerton, Michael G. Jones, and James L. Buckley. The paper was presented at the 18$^{th}$ AIAA/CEAS Aeroacoustics Conference (33$^{rd}$ AIAA Aeroacoustics Conference) held Jun. 4, 2012, through Jun. 6, 2012, in Colorado Springs, Colo.

DETAILED DESCRIPTION OF THE EMBODIMENTS

Some embodiments of the present invention bend cells, include holes between two or more cells, or both, to provide a broadband acoustic liner with reduced height that effectively absorbs lower frequency noise in addition to higher frequencies. Broadband frequencies absorbed by some embodiments range between 400-3,000 Hz, but any other desired frequency ranges many be absorbed, depending on the volume and height constraints and cell architecture. The frequencies at which cells should be bent and/or how many cells are connected via perforations depends on cell width and the maximum height of the liner. Such embodiments create the effect of a cell length that is longer than the actual vertical height of the cells. As such, the overall height of the acoustic liner may be reduced. Such liners may be useful for integration with turbine engines used for propelling aircraft, for commercial power production, or for any other use.

Many embodiments may be used to reduce noise in the engine core, where minimization of the liner height can be an enabling feature. For instance, the embodiments shown in FIGS. 5-9 may be particularly well suited for this purpose, where designers might be willing to trade treated surface area for lower frequency limits. However, some embodiments may be used for noise reduction in any other suitable engine location including, but not limited to, the aft fan duct. The embodiments depicted in FIGS. 3 and 4 may be better suited for such an application.

Conventional Acoustic Liner Architecture

Figure 1:
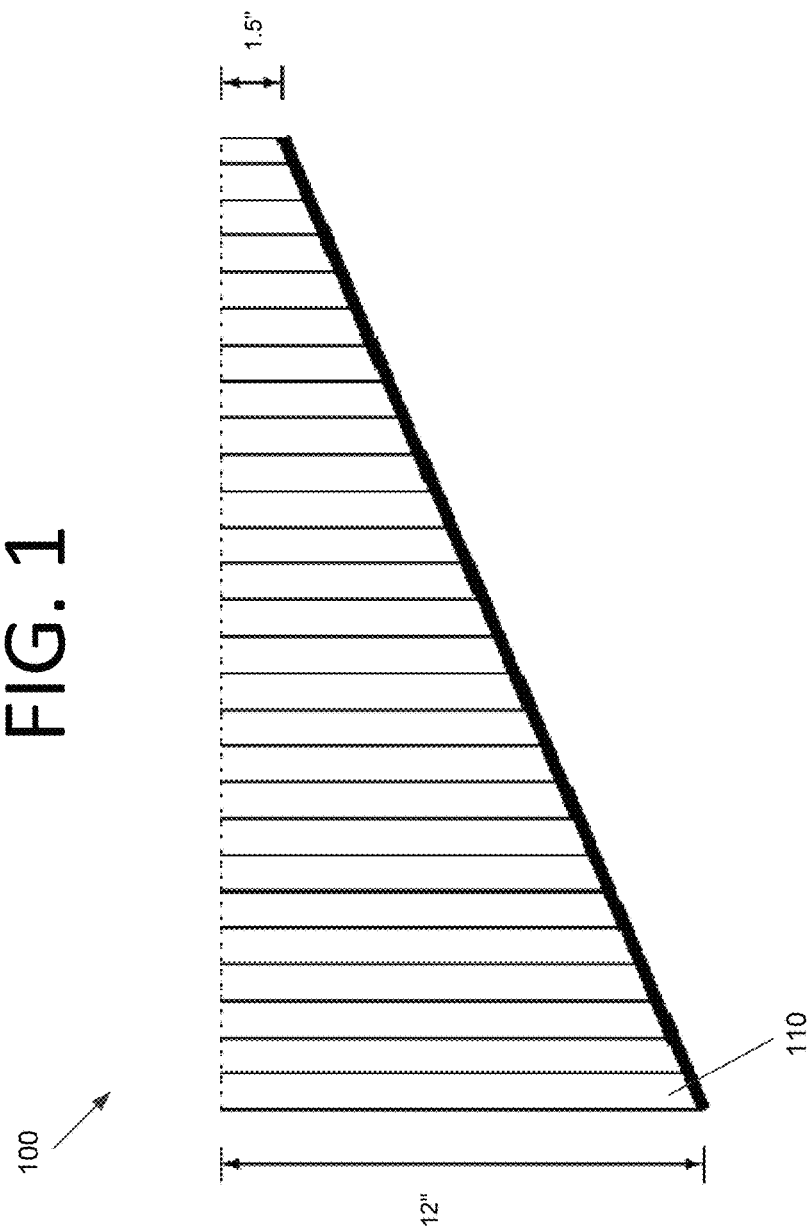
FIG. 1 illustrates an acoustic liner with adjacent cells of variable height.
Figure 2:
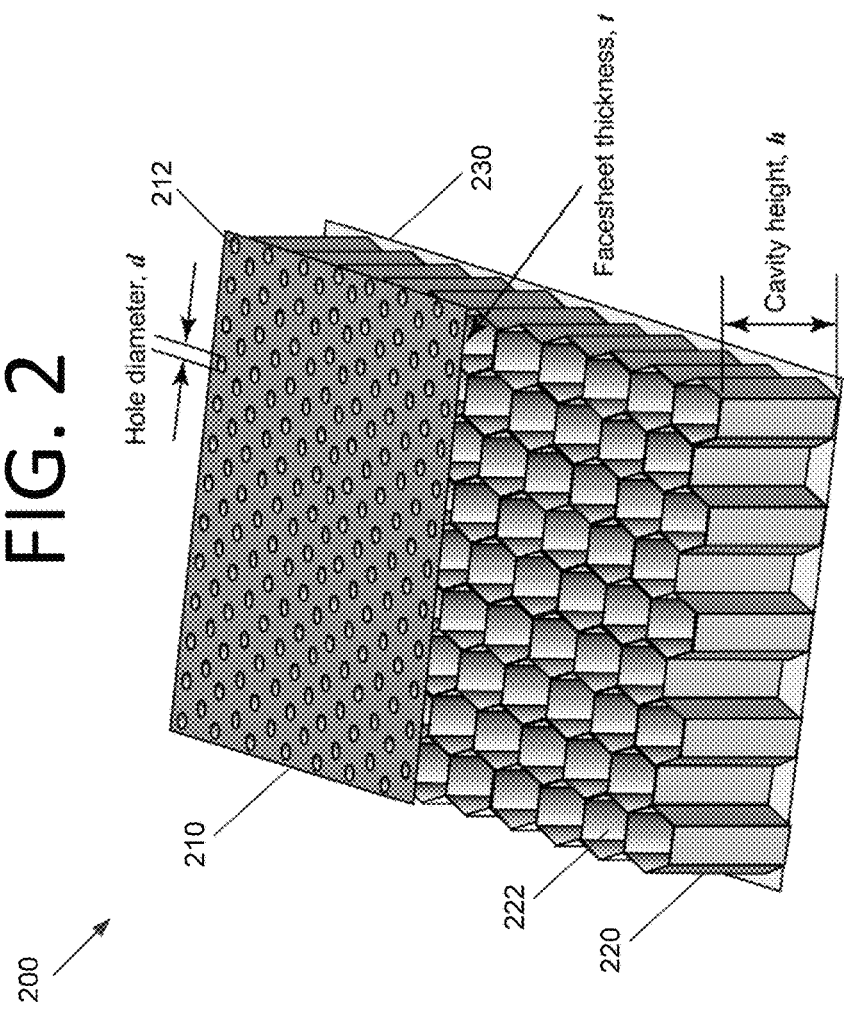
FIG. 2 illustrates an acoustic liner with a uniform height and a honeycomb configuration.

For absorption of a desired frequency, the cell cavity height and width controls the frequency at which maximum absorption occurs. FIG. 2 illustrates a single layer conventional acoustic liner 200 with a uniform height and a honeycomb configuration that is used in a fan exhaust duct. A thin facesheet 210 having a plurality of holes 212 covers cells 220 having respective cavities 222. Facesheet 210 may be between 0.025 inches and 0.1 inches thick, with holes having a diameter of approximately 0.030 inches to 0.050 inches. The geometry (i.e., thickness, hole diameter, and porosity) of facesheet 210 controls the amount of acoustic absorption that will occur. A thicker facesheet can contribute to noise reduction and provide increased strength and impact resistance. However, increased facesheet thickness also increases the weight of the liner. Backplate 230 is attached to the other side of cells 220 and is rigid.

The Relationship Between Cell Geometry and Absorption Characteristics

In some embodiments, longer chamber lengths for lower frequency absorption are achieved by bending cells such that they can be packaged in the available space. When designing an acoustic liner, cells may have any desired channel shape, including, but not limited to, hexagonal, round, square, rectangular, and half-sine channel shapes. However, the hexagonal, or honeycomb, geometry may be superior due to the improved strength that it provides.

Some embodiments use a quarter-wavelength resonator to achieve sound absorption. The frequency that is absorbed for a quarter-wavelength resonator is defined by:

$$f = \frac{c}{4L}$$

where f is the frequency in Hertz (Hz) where maximum absorption occurs, c is the speed of sound in meters per second (m/s), and L is the length of the cell in meters (m).

A Helmholtz resonator may also be used. The frequency that is absorbed for a Helmholtz resonator is defined by:

$$f = \frac{c}{2\pi}\sqrt{\frac{S}{VL}}$$

where S is the surface area of the orifice in m$^2$, V is the volume of the air within the cell in m$^3$, and L is the thickness of the facesheet in m. f and c are the same as above. In some embodiments, all cells may be quarter-wavelength resonators, all cells may be Helmholtz resonators, or a combination of quarter-wavelength resonators and Helmholtz resonators may be used for different cells.

Combined Straight and Bent Cell Acoustic Liners

Figure 3:
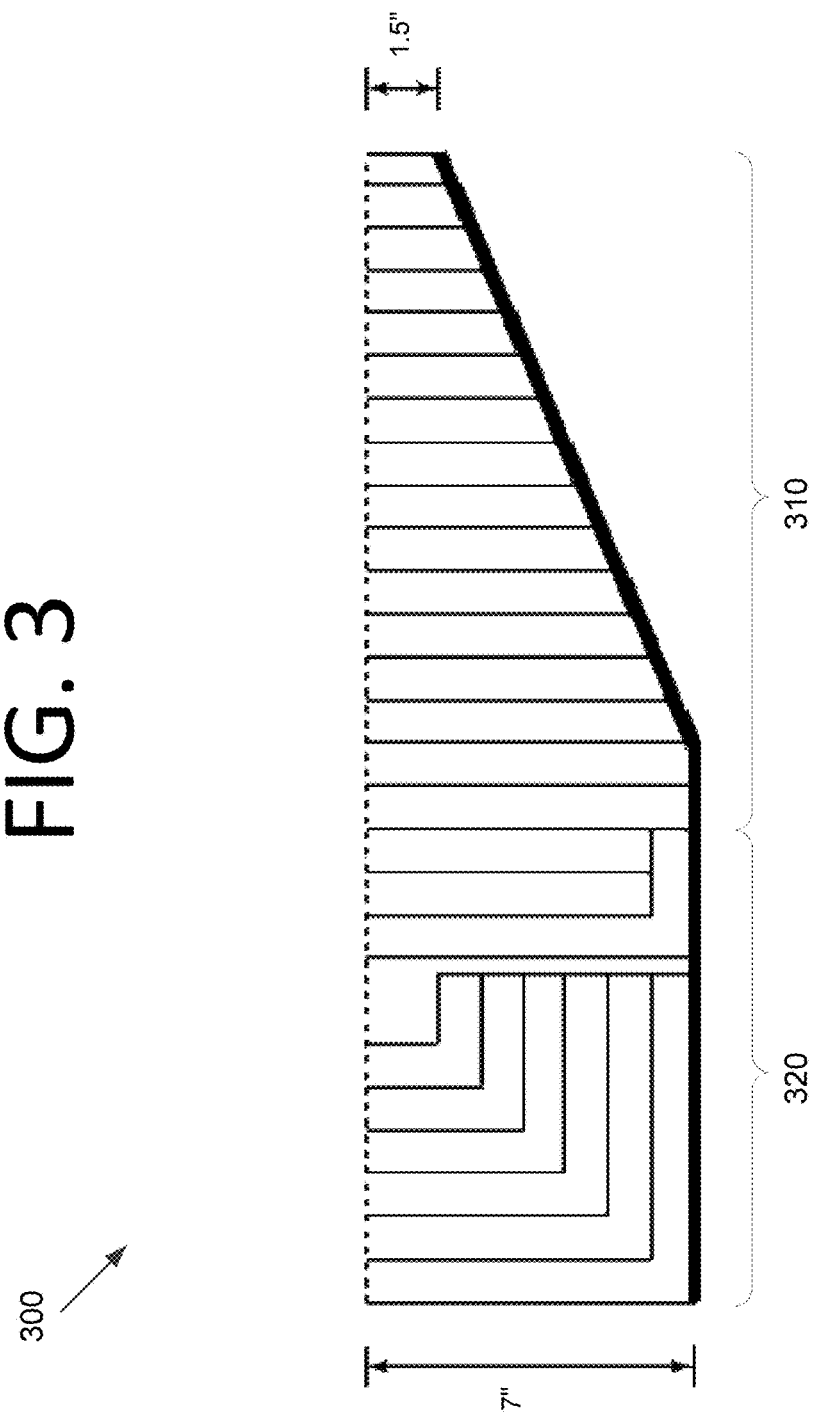
FIG. 3 illustrates a broadband acoustic liner having a straight cell section and a bent cell section, according to an embodiment of the present invention.

FIG. 3 illustrates a broadband acoustic liner 300 having a straight cell section 310 and a bent cell section 320, according to an embodiment of the present invention. Straight cell section 310 has cells with chambers oriented in a direction orthogonal to the facesheet of acoustic liner 300, but some variation in the orientation is possible. In FIG. 3, the shortest chamber length in straight cell section 310 is 1.5 inches, but this could be further reduced (e.g., to 0.5 inches) if desired to address higher frequency noise.

Bent cell section 320 includes cells with bent chambers of varying lengths to absorb progressively lower frequencies as the overall length increases. In FIG. 3, the chambers are bent at a right angle and packaged in such a way as to maximize the use of the available volume, with a longest chamber having a length of 13 inches, although bent cell section 320 only has a height of 7 inches. However, various cell geometries are possible, including, but not limited to, curved chambers, chambers having an "S" shape, chambers having irregular shapes that vary in thickness from one part of the chamber to another, a bent cell section where individual cells have different geometries from one another, etc. Also, in various embodiments, any suitable dimensions and chamber lengths may be used. While generally shown as gradually increasing in length from right to left, each chamber may have any desired length with respect to adjacent chambers in some embodiments.

Extending Effective Chamber Length Using Holes

Figure 4:
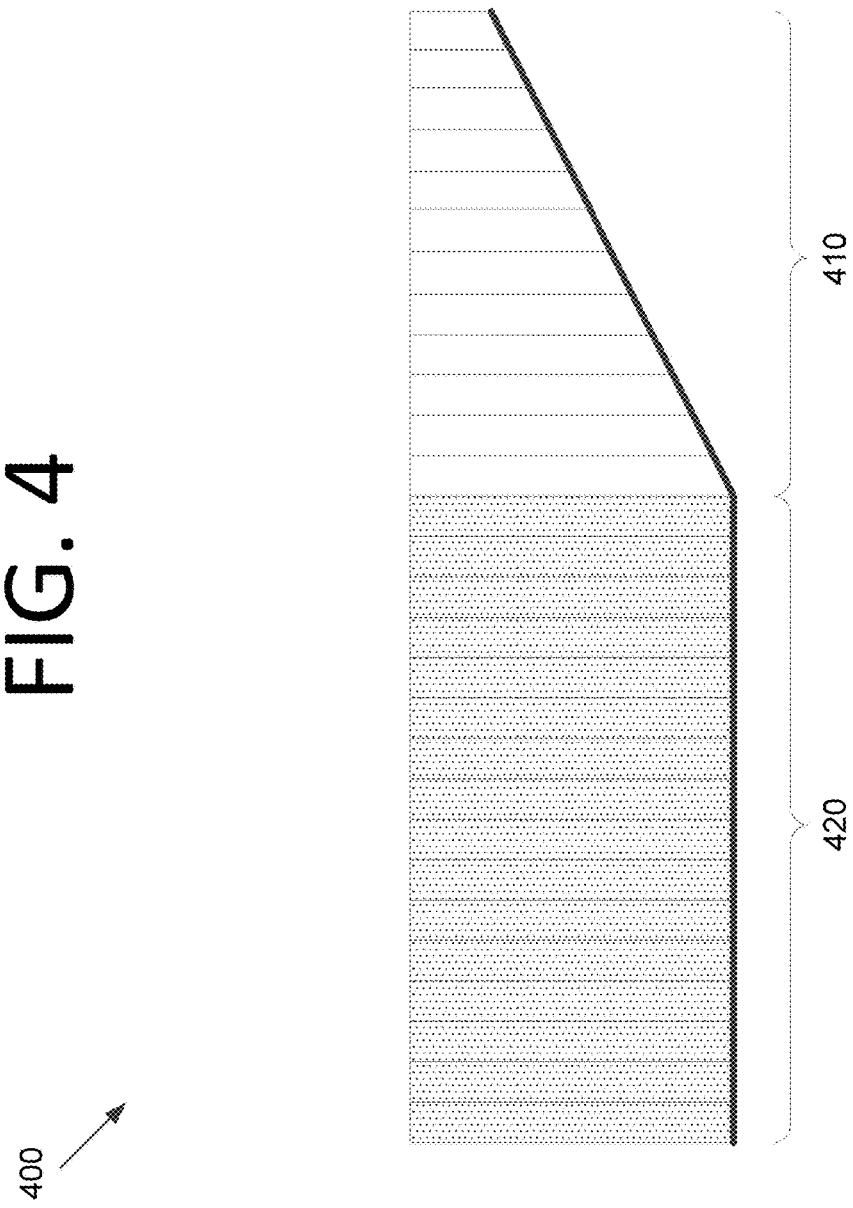
FIG. 4 illustrates a broadband acoustic liner having a straight cell section and a perforated cell section, according to an embodiment of the present invention.

In some embodiments, rather than bending the chambers, holes may be placed between cells having a uniform height to effectively combine chambers and cause the chambers to absorb noise as though the chambers are taller than they actually are. Some embodiments also combine a variable height straight section with a uniform height section having such holes. For example, FIG. 4 illustrates a broadband acoustic liner 400 having a variable height straight cell section 410 and a uniform height perforated cell section 420, according to an embodiment of the present invention. The perforations are sized and placed so as to achieve the desired attenuation.

Including holes (e.g., perforations, openings, tapers, slots, etc. of any desired shape and/or size) causes the combined cells to absorb noise as though they were a single cell that is taller than their actual height (i.e., a "virtual" height). However, it is possible in some embodiments to have holes between adjacent cells without reducing the frequency of peak attenuation. The holes may be of various sizes and shapes, and have various positions. Further, hole size and position may vary within the same cell, from one cell to another, or both. Additional design flexibility can also be achieved by utilizing more than one liner to obtain the desired noise reduction, and additional liners could be placed downstream from the initial core liner.

Figure 5:
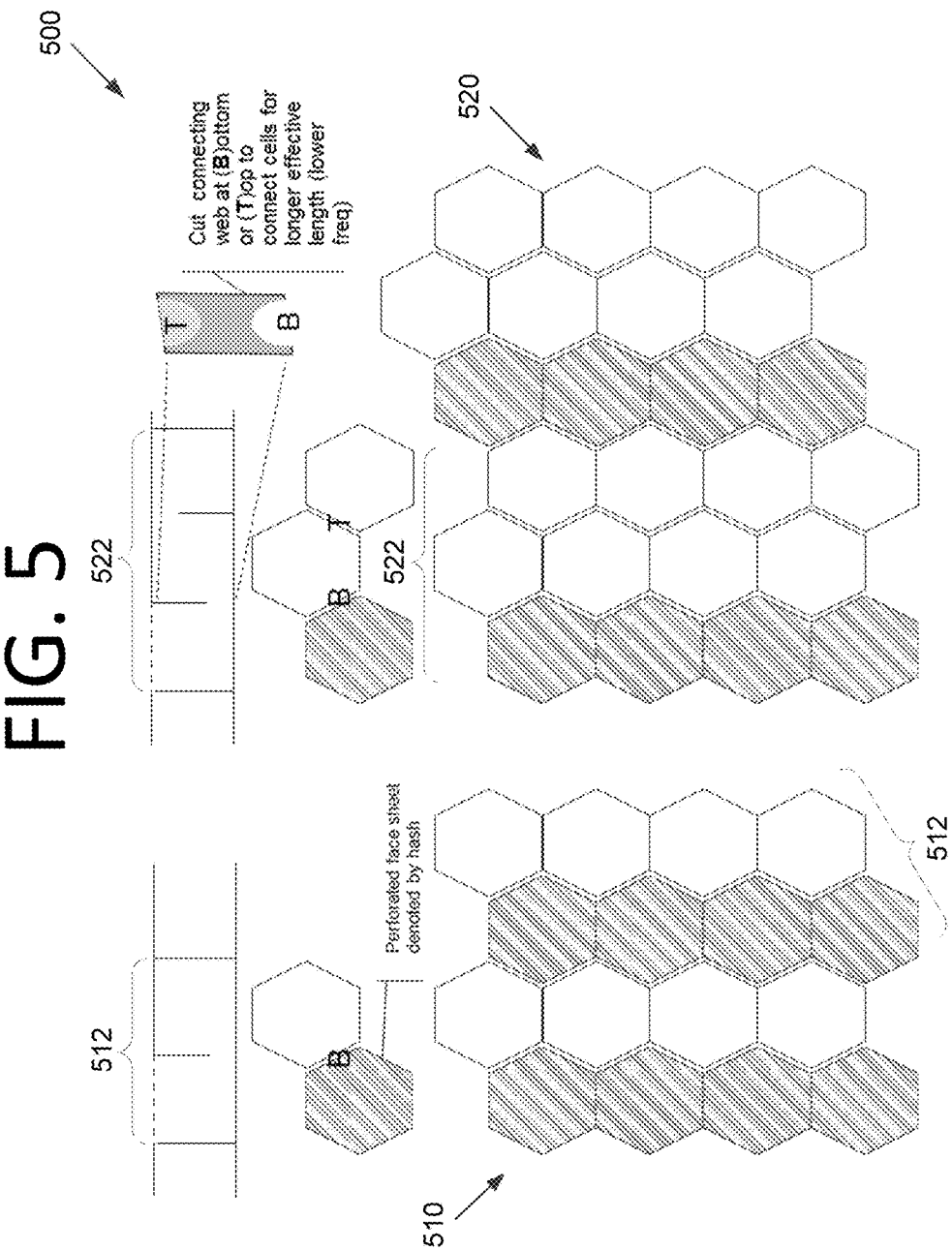
FIG. 5 illustrates arrangements of facesheet perforations and holes between cells that create an extended effective chamber length by connecting honeycomb cells, according to an embodiment of the present invention.

FIG. 5 illustrates arrangements 500 of facesheet perforations and holes between cells that create an extended effective chamber length by connecting honeycomb cells, according to an embodiment of the present invention. In two cell implementation 510, each pair of cells 512 is connected via a cut at the bottom of the cell pair B, forming a hole. In three cell implementation 520, each trio of cells 522 is connected via cuts. The center cell is connected to the left cell via a bottom cut B and connected to the right cell via a top cut T.

The cell triples may be in any pattern, so long as each cell can be connected to at least one other cell via a hole. For instance, the pattern may be straight, triangular, etc. Further, in the triangular configuration, each cell may be connected to both other cells via holes. Cells need not be hexagonal and may have any suitable shape. Other shapes and configurations are possible with other chamber shapes, and all chambers need not have the same geometry. Further, groups of connected cells can be four cells, five cells, or any number of cells that is desired for the specific implementation.

Figure 6:
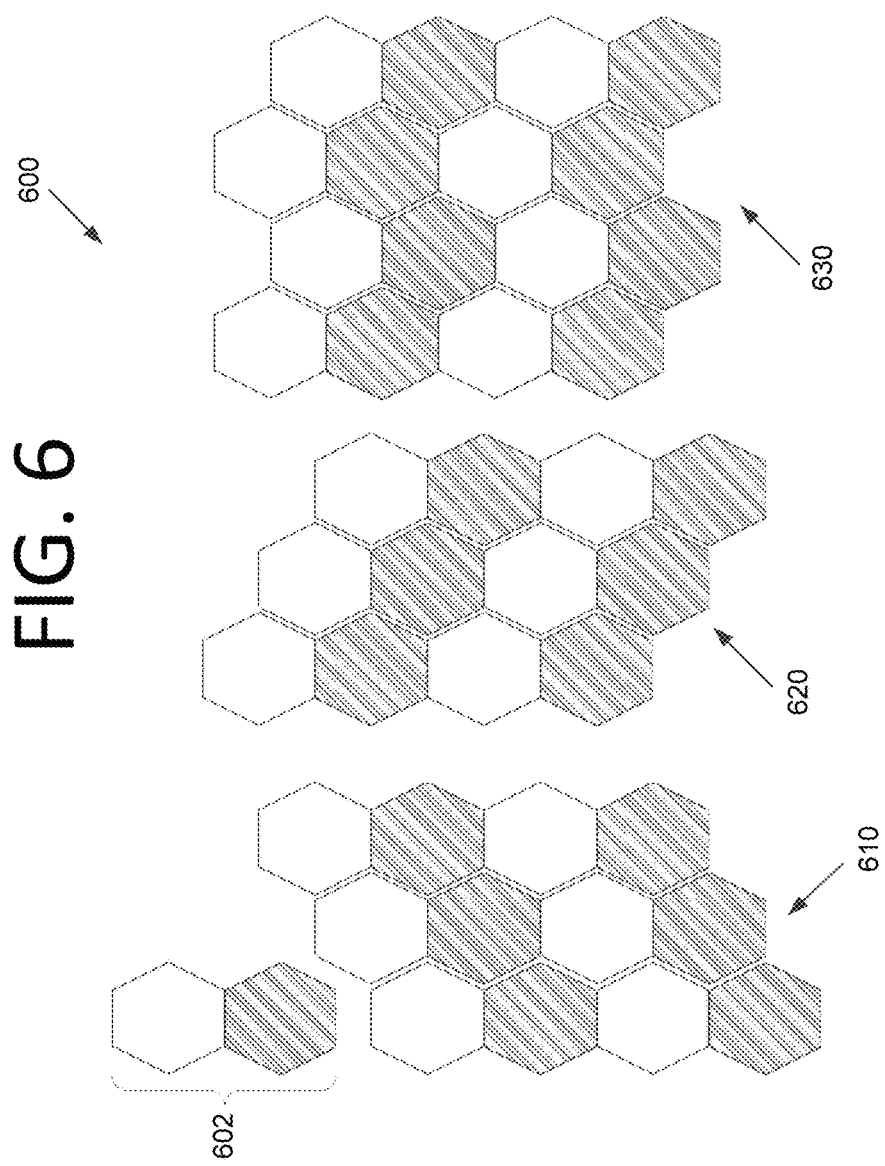
FIG. 6 illustrates two cell honeycomb arrangements, according to an embodiment of the present invention.

FIG. 6 illustrates two cell honeycomb arrangements 600, according to an embodiment of the present invention. Cell pairs 602 may be arranged so as to target specific spinning modes of the turbine, for example. Arrangement 610 shows an axial pattern rising from left to right. Arrangement 620 shows an axial pattern rising from right to left. Arrangement 630 shows a horizontal zigzag pattern. However, active cells could have any desired pattern, such as circumferential, axial, helical, zigzag patterns, etc. Further, in some embodiments, multiple cell patterns may be used for various cell tuples or the cell pattern may be irregular.

Figure 7:
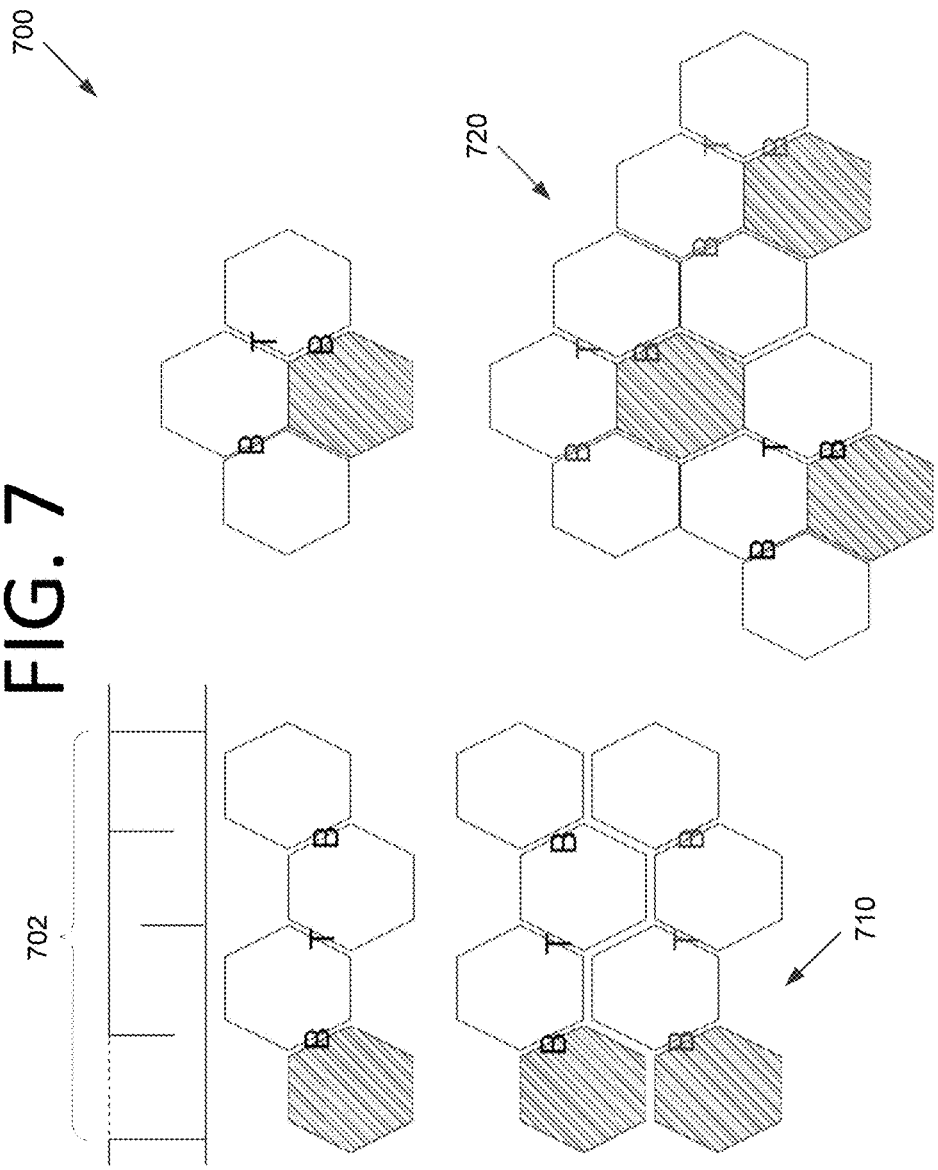
FIG. 7 illustrates four cell honeycomb arrangements, according to an embodiment of the present invention.

FIG. 7 illustrates four cell honeycomb arrangements 700, according to an embodiment of the present invention. Cell tuple 702 contains four cells, where from left to right, the hole between the first and second cells is on the bottom, the hole between the second and third cells is on the top, and the hole between the third and fourth cells is on the bottom. Arrangement 710 shows a horizontal zigzag configuration, and arrangement 720 shows a configuration where each cell in the tuple is adjacent to two others.

Figure 8:
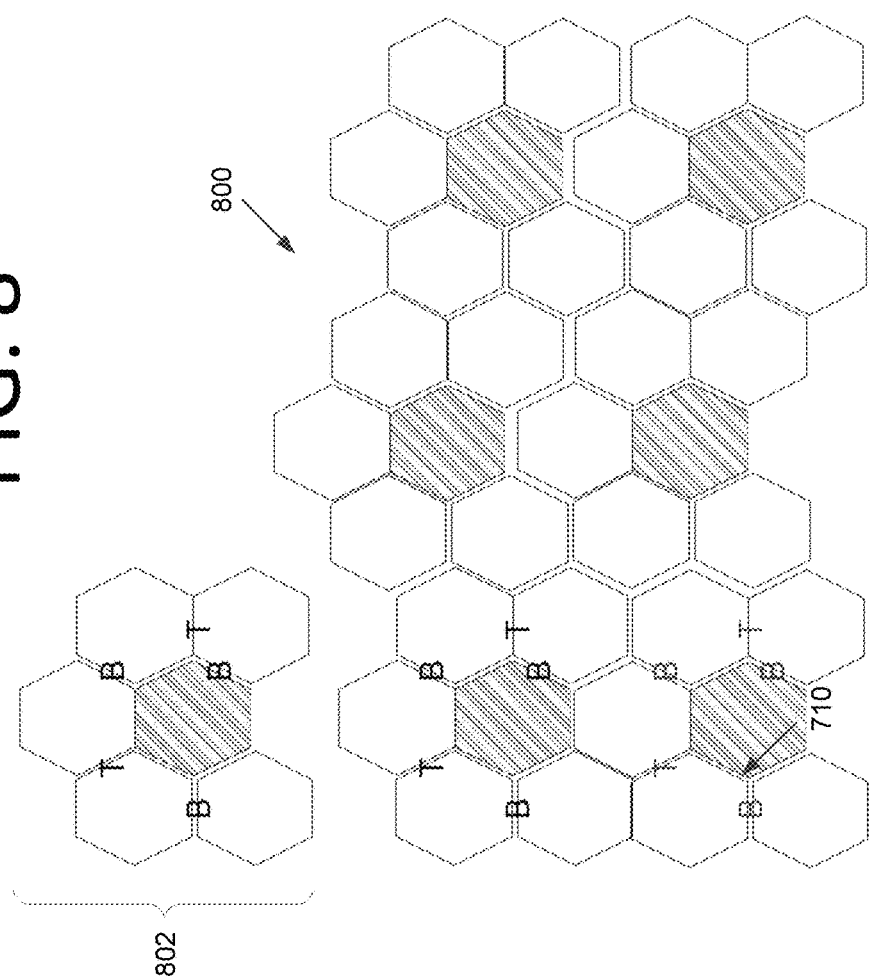
FIG. 8 illustrates a six cell honeycomb arrangement, according to an embodiment of the present invention.

FIG. 8 illustrates a six cell honeycomb arrangement 800, according to an embodiment of the present invention. Cell tuple 802 has a center cell that is adjacent to other cells of the tuple on all sides but one. The single non-adjacent side is adjacent to a cell of the next tuple. In embodiments where holes are placed between more chambers, such that there is "communication" over a larger span-wise extent, absorption over a broader frequency range should be possible. However, the peak amount of absorption would be reduced accordingly.

Figure 9:
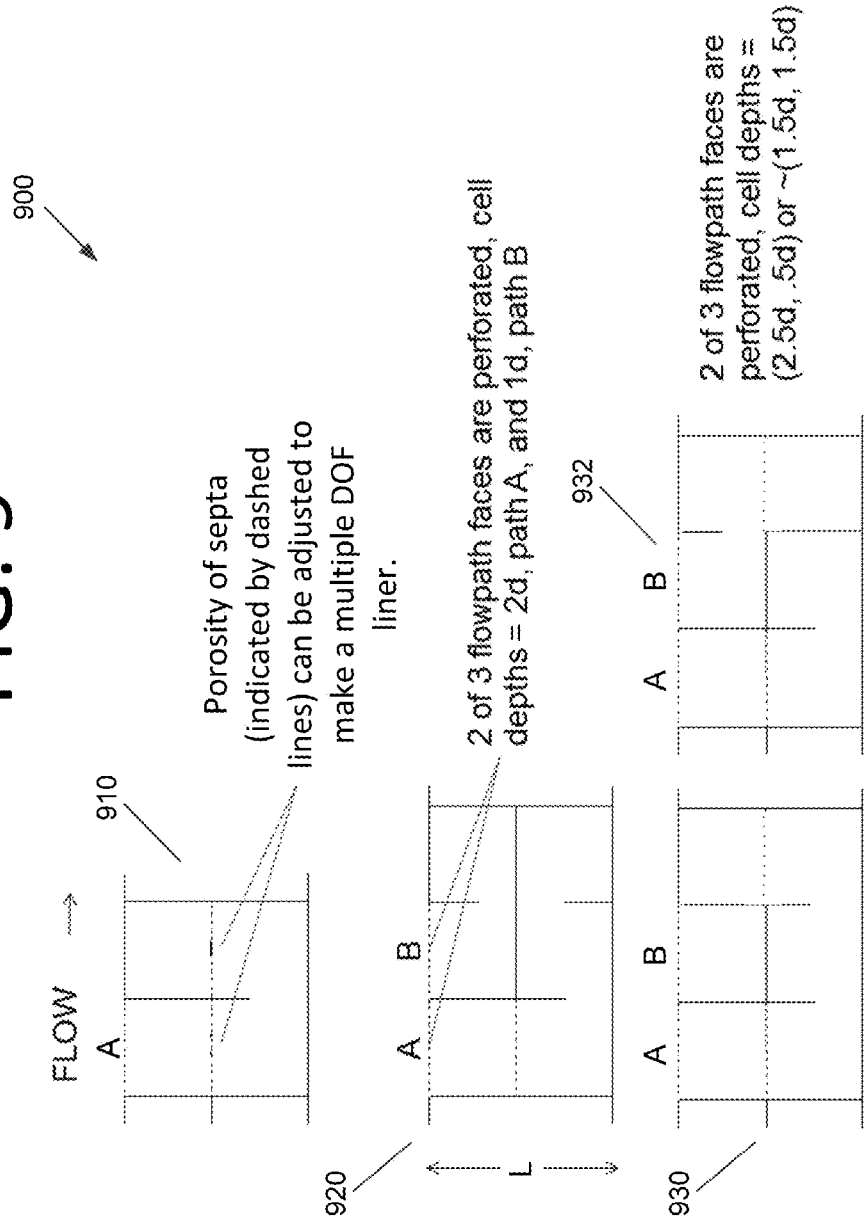
FIG. 9 illustrates various multi-cell configurations, according to an embodiment of the present invention.

FIG. 9 illustrates various multi-cell configurations 900, according to an embodiment of the present invention. All of the cell tuples have a cell length L. A single flowpath cell tuple 910 includes a hole between the bottom of the cells, connecting the chambers thereof and creating an effective length of 2L for flowpath A. The dashed lines indicate septa, or walls, that are perforated to permit the passage of air. The porosity of the septa can be adjusted to form a multiple degree of freedom ("DOF") liner. The static structure of the holes of the septa may have different resistances depending on the flow direction.

A dual flowpath cell tuple 920 has perforated septa over two of the three flowpath faces. Flowpath A has a length of 2L and flowpath B has a length of L. In this manner, two different frequencies can be optimally absorbed by a single cell tuple.

Dual flowpath cell tuple 930 has perforated septa over two of three flowpath faces. Flowpath A has a length of 2.5L and flowpath B has a length of 0.5L. In dual flowpath cell tuple 932, flowpath A has a length of 1.5L and flowpath B also has a length of 1.5L.

Figure 10A:
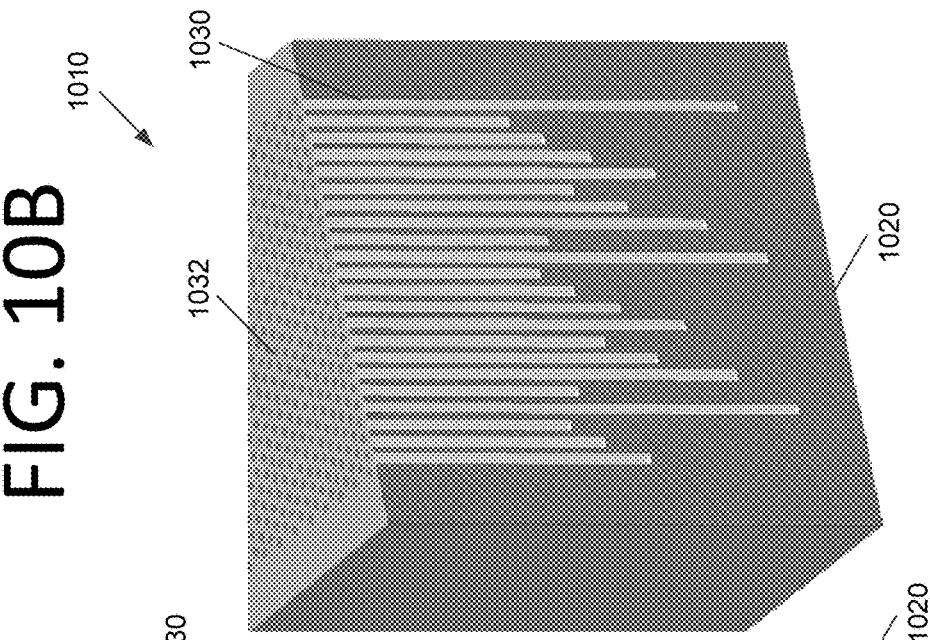
FIG. 10A illustrates a front cutaway view of a variable depth straight cell acoustic liner, according to an embodiment of the present invention.
Figure 10B:
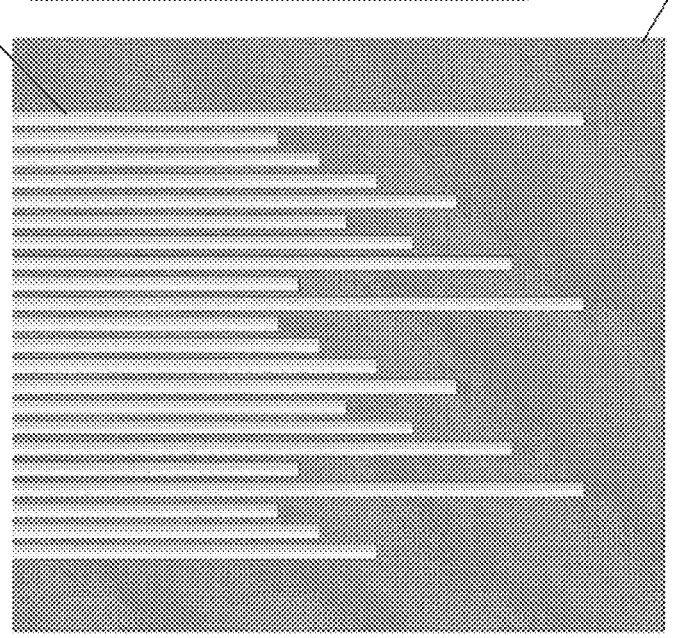
FIG. 10B illustrates an orthogonal cutaway view of a variable depth straight cell acoustic liner, according to an embodiment of the present invention.

FIG. 10A illustrates a front cutaway view 1000 of a variable depth straight cell acoustic liner 1020, according to an embodiment of the present invention. FIG. 10B illustrates an orthogonal cutaway view 1010 of the variable depth straight cell acoustic liner 1020, according to an embodiment of the present invention. Cells 1030 are square cells having straight channels with variable depths. A perforated facesheet 1032 covers cells 1030, as shown in FIG. 10B.

Figure 11:
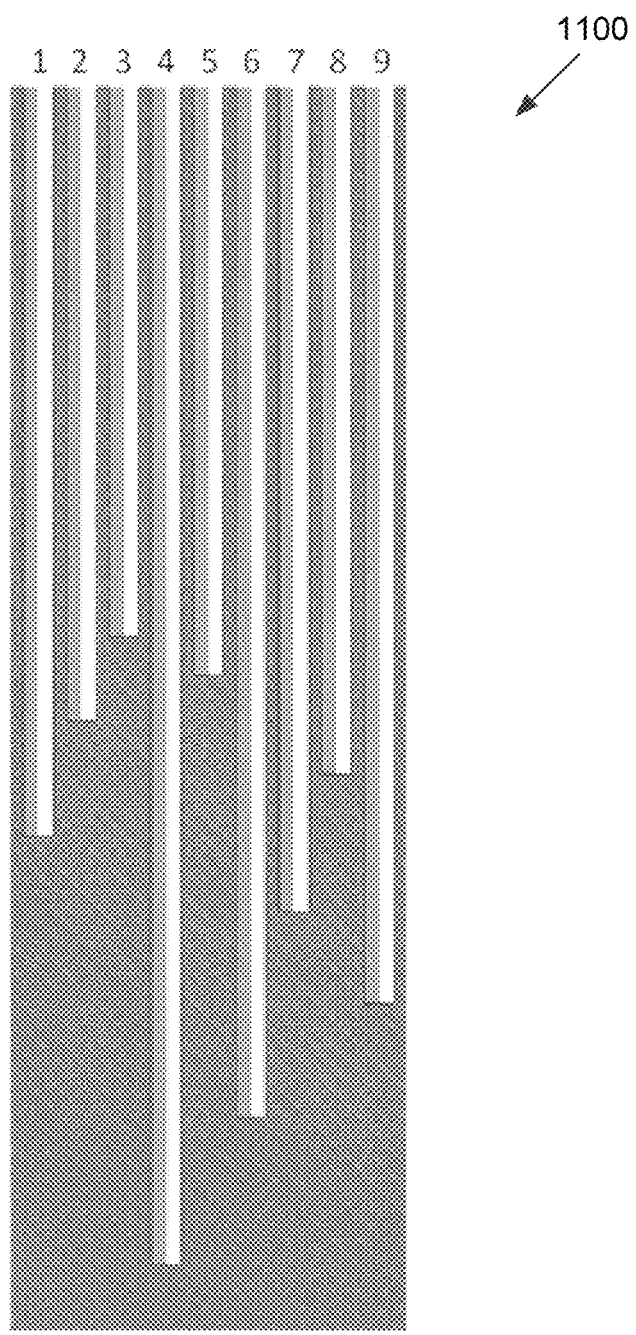
FIG. 11 illustrates a side view of numbered variable depth straight cells, according to an embodiment of the present invention.

FIG. 11 illustrates a side view 1100 of numbered variable depth straight cells, according to an embodiment of the present invention. Total length for each chamber is shown in Table 1 below. Table 1 is from *Development and Validation of an Interactive Liner Design and Impedance Modeling Tool* by Brian M. Howerton, Michael G. Jones, and James L. Buckley.

TABLE 1

CHANNEL LENGTHS

| Chamber: | Total Length in mm (inches): |
|---|---|
| 1 | 38.99 (1.535) |
| 2 | 32.97 (1.298) |
| 3 | 28.58 (1.125) |
| 4 | 61.26 (2.412) |
| 5 | 30.63 (1206) |

TABLE 1-continued

CHANNEL LENGTHS

| Chamber: | Total Length in mm (inches): |
|---|---|
| 6 | 53.59 (2.110) |
| 7 | 42.88 (1.688) |
| 8 | 35.74 (1.407) |
| 9 | 47.65 (1.876) |

FIG. 12A illustrates a front cutaway view 1200 of a variable depth straight and bent cell acoustic liner 1220, according to an embodiment of the present invention. FIG. 12B illustrates an orthogonal cutaway view 1210 of the variable depth straight and bent cell acoustic liner 1220, according to an embodiment of the present invention. Cells 1230 are square cells having straight or bent channels with variable depths. Bent channels are used when the channel length exceeds a predetermined length. In this manner, the overall thickness of liner 1220 may be reduced. A perforated facesheet 1232 covers cells 1230, as shown in FIG. 12B.

Figure 13:
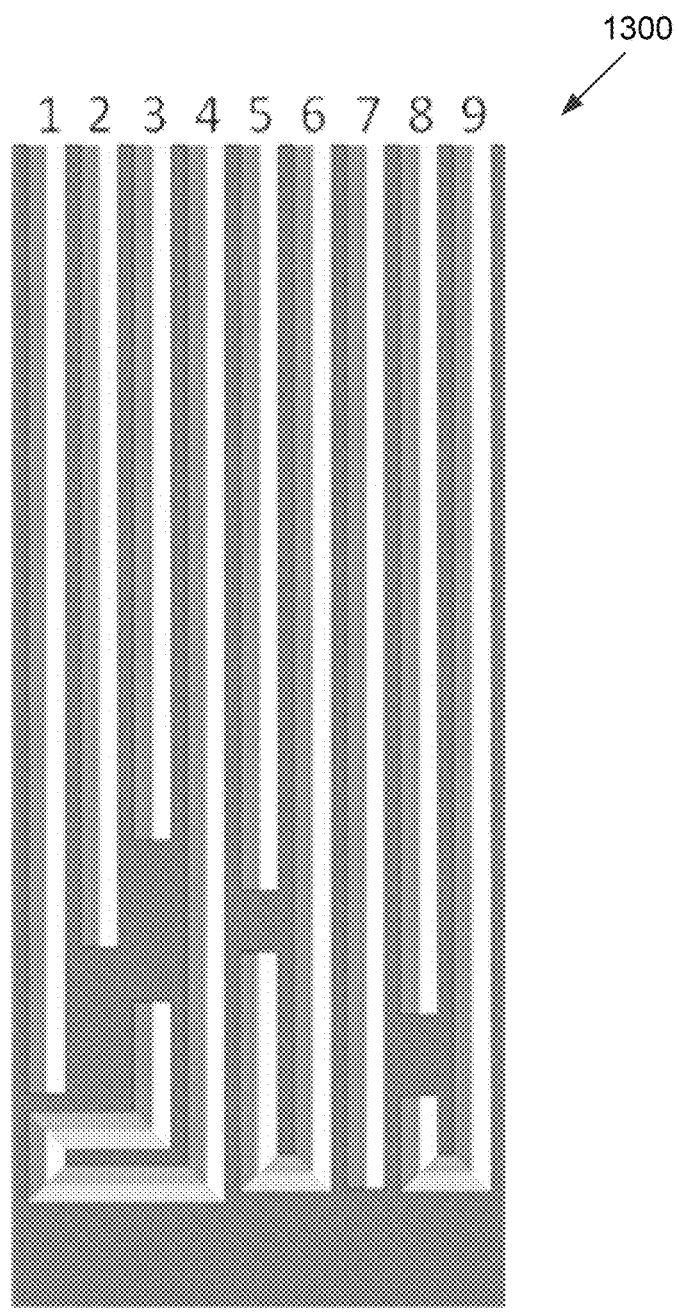
FIG. 13 illustrates a side view of numbered variable depth straight and bent cells, according to an embodiment of the present invention.

FIG. 13 illustrates a side view 1300 of numbered variable depth straight and bent cells, according to an embodiment of the present invention. The channels in FIG. 13 have the same length as the channels in FIG. 11. However, in FIG. 13, channels 4, 6, and 9 are bent to reduce the overall thickness of the liner beyond what is possible in FIG. 11.

Figure 14:
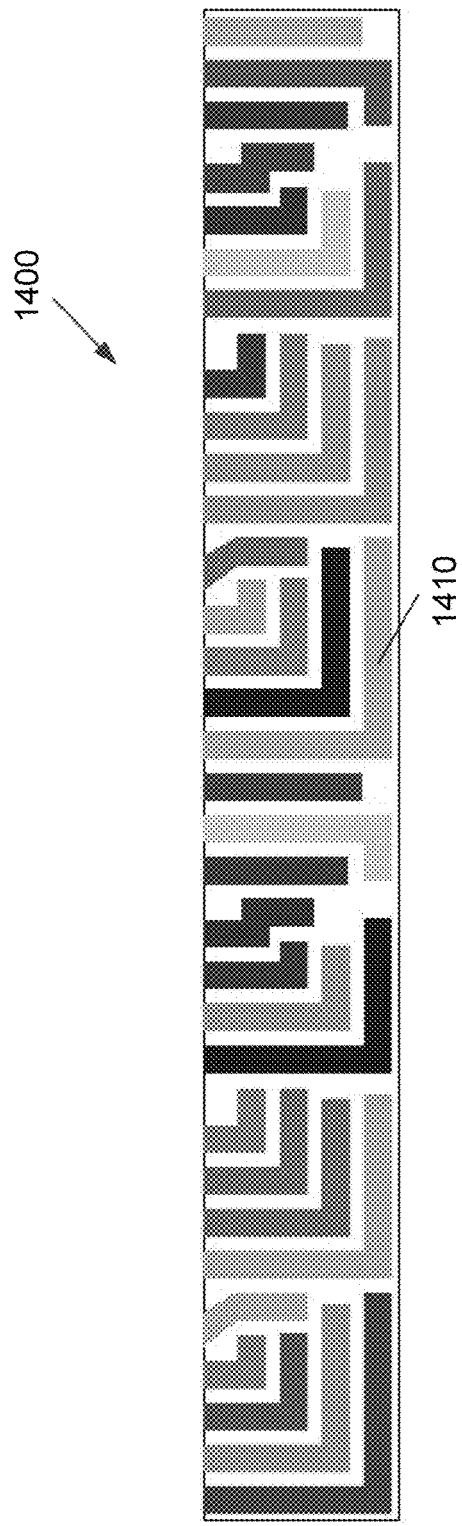
FIG. 14 illustrates a notional bent cell liner having various channel shapes, according to an embodiment of the present invention.

FIG. 14 illustrates a notional bent cell liner 1400 having various channel shapes, according to an embodiment of the present invention. Channels 1410 are straight or include multiple straight sections that are bent with respect to one another at various angles. In some embodiments, some or all of the channels may be bent such that they have curved sections in addition to, or instead of, straight sections.

Facesheet Holes

Using holes in the facesheet, the hydrodynamic and acoustic oscillations in the flow will induce jets that can be used for flow control. For example, boundary layer properties may be modified to reduce drag, or to keep flow attached in adverse pressure gradients.

The holes in the facesheet can be angled, sized, and shaped (e.g., non-cylindrical shapes) to maximize flow control ability while maintaining the acoustic properties of the liner. Holes could be tapers, slots, or any other desired configuration. Hole shape is important for boundary layer flow effects. The liner can then simultaneously provide flow control and acoustic damping. In some embodiments, the thickness of the facesheet may also be increased to achieve improved lower frequency absorption. For instance, in some embodiments, frequency may be better reduced by increasing the facesheet thickness to up to 0.2 inches, but any desired thickness may be used.

A statically tuned liner can be fabricated with one or more perforated septa, parallel to the face so as to divide the cells and provide tuning at additional frequencies. The liner can also be tuned to multiple frequencies by fabricating the honeycomb cells with variable area, but fixed depth, or by adjusting the resistance through the hole geometry (resistance is affected by facesheet porosity, hole diameter, hole angle relative to the surface, hole shape, and facesheet thickness). These approaches may be used in combination to optimize the acoustic and aerodynamic performance of the liner, while taking into consideration the installation requirements and allowable volume in the endwalls or blade surfaces.

An actively tuned liner can be created such that the tuning frequency or frequencies are adjusted for maximum acoustic benefit by adjusting the resistance of the facesheet, by adjusting the resistance of the perforated septa, or by adjusting the backplate (hard wall or damping). In some embodiments, the backplate may be pliable rather than rigid in order to better absorb lower frequency noise. In certain embodiments, the backplate may be perforated rather than solid in order to permit a bias flow. These changes can be affected through adaptable materials incorporated into the liner. The tuning of the liner can be in response to external inputs (e.g., operating condition-dependent local temperature may trigger a shape memory alloy), or to a control signal (e.g., to a piezoelectric element in the liner).

Hybrid Bent Cell and Perforated Cell Approach

In certain embodiments, a hybrid approach may be implemented. In other words, chambers may be bent and/or have an irregular shape, as well as having holes between two or more of the chambers. It is also possible in some embodiments for cells to be one or more of straight only, bent only, straight with holes, and bent with holes, all within the same acoustic liner. It is further possible for a straight cell to be connected via holes to a bent cell, and vice versa.

Damage Tolerance

In some embodiments, it is desirable to have the compression strength of the liner structure remain above a certain level even when the facesheet of the liner has been damaged. While a Helmholtz resonator could be used to absorb lower frequency noise in the core, the open volume of such an approach reduces structural integrity. Accordingly, a honeycomb approach, or another configuration with closely packed cells of relatively small width, may be desirable to achieve greater strength and superior performance should liner damage occur.

High Temperature Acoustic Liners

The temperature in the turbine engine core is generally sufficiently high to require the use of specially selected materials. For example, in many turbines, the operating air temperature in the core may exceed 900° F. Ceramic matrix composite ("CMC") material has been demonstrated to be capable of handling these high temperatures, and can be formed into appropriate shapes for use in an acoustic liner. Various CMC materials, such as oxide/oxide, SiC/SiC (or SiC/SiNC), and C/SiC could be utilized. Oxide/oxide CMC materials provide environmental stability and lower thermal conductivity and SiC/SiC and C/SiC offer higher temperature capability. However, SiC/SiC and C/SiC generally need coatings to prevent oxidation of the composite.

Oxide/oxide CMC materials generally provide superior resistance to oxidation and have lower cost. Oxide/oxide CMC materials may have a density of about 2.8 g/cc vs. the 8.4 g/cc density of a metallic liner made of IN625. This offers the potential for component weight reduction.

Thermal Barrier

The use of CMC material offers a significant dual usage. First, the CMC material can be used to fabricate the broadband liner configurations discussed herein. Second, the CMC material that forms the acoustic liner (facesheet, cells, and especially the backplate) generally has low thermal conductivity due to the significant matrix porosity and the composition of the fibers/matrix (in particular, when using the oxide materials). An oxide/oxide liner system serves as a thermal barrier to limit the amount of heat that is transferred to the adjacent bypass duct. Conventionally, a separate thermal barrier is used for this purpose. Thus, by using the CMC material to build the liner, the thermal barrier can be eliminated (or at least the thickness thereof can be significantly reduced), thereby reducing the overall diameter of the engine nacelle. This should result in reduced weight, which, in turn, should reduce the amount of fuel that is burned.

Furthermore, the low thermal conductivity of the CMC material, compared to that of a metal liner, reduces the need for cooling and thermal treatment in the liner areas. This reduces the weight of the engine, and frees up volume that may reduce the size of the engine core, allowing for a higher bypass ratio (and hence, a propulsively more efficient) engine with the same overall engine dimensions. Alternatively, more room may be provided for engine accessories and controls.

Some embodiments of the present invention use bent cells, holes between cells, or a combination thereof to increase effective cell length and reduce the overall height of an acoustic liner. Some embodiments also incorporate thermally tolerant, strong, lightweight materials, such as CMC materials, to reduce liner weight and size. This allows engine weight to be reduced for greater fuel efficiency and/or frees up space for additional engine components.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a single layer acoustic liner for absorbing sound waves, said single layer acoustic liner comprising:
a plurality of cells with straight chambers, each cell with a straight chamber having a length and an opening at one end for receiving sound waves directly from the environment;
a plurality of cells with a bent chamber, each cell with a bent chamber having a length and an opening at one end for receiving sound waves directly from the environment;
wherein the openings for the plurality of cells with straight chambers and the plurality of cells with a bent chamber are coplanar to create a single layer acoustic liner.

2. The apparatus of claim 1, wherein the plurality of cells with a bent chamber each have a different length that is configured to optimally absorb different frequencies.

3. The apparatus of claim 2, wherein the plurality of cells with a bent chamber have a rectangular, curved, "S"-shaped, or irregularly shaped geometry.

4. The apparatus of claim 2, wherein two or more of the plurality of bent cells have different geometries from one another.

5. The apparatus of claim 1, wherein at least one of the plurality of cells with a bent chamber comprises a hole operably connecting its chamber to a chamber of an adjacent cell.

6. The apparatus of claim 1, wherein the apparatus comprises a ceramic matrix composite material.

* * * * *